United States Patent
Cheenath et al.

(10) Patent No.: US 8,370,848 B2
(45) Date of Patent: *Feb. 5, 2013

(54) METHOD AND SYSTEM FOR PROVIDING A CLIENT ACCESS TO AN EXTERNAL SERVICE VIA AN APPLICATION SERVICES PLATFORM

(75) Inventors: Manoj Cheenath, San Ramon, CA (US); Doug Chasman, Pittsford, NY (US)

(73) Assignee: salesforce.com, inc., San Francisco, CA (US)

( * ) Notice: Subject to any disclaimer, the term of this patent is extended or adjusted under 35 U.S.C. 154(b) by 1333 days.

This patent is subject to a terminal disclaimer.

(21) Appl. No.: 11/778,587

(22) Filed: Jul. 16, 2007

(65) Prior Publication Data

US 2008/0086735 A1 Apr. 10, 2008

Related U.S. Application Data

(60) Provisional application No. 60/827,876, filed on Oct. 2, 2006.

(51) Int. Cl.
*G06F 3/00* (2006.01)
*G06F 9/44* (2006.01)
*G06F 9/46* (2006.01)
*G06F 13/00* (2006.01)
(52) U.S. Cl. .................. 719/313; 719/315; 719/330
(58) Field of Classification Search .................. None
See application file for complete search history.

(56) References Cited

U.S. PATENT DOCUMENTS

| 7,657,454 B2 * | 2/2010 | Kayahara et al. ............ 705/7.22 |
| 2003/0233404 A1 | 12/2003 | Hopkins ........................ 709/203 |
| 2004/0210909 A1 | 10/2004 | Dominguez, Jr. et al. .... 719/316 |
| 2005/0065925 A1 | 3/2005 | Weissman et al. ................ 707/4 |
| 2005/0080914 A1 * | 4/2005 | Lerner et al. .................. 709/230 |
| 2005/0223022 A1 | 10/2005 | Weissman et al. ............. 707/102 |
| 2005/0283478 A1 | 12/2005 | Choi et al. ......................... 707/9 |
| 2006/0206834 A1 | 9/2006 | Fisher et al. ................... 715/777 |
| 2007/0118844 A1 * | 5/2007 | Huang et al. ................... 719/330 |
| 2007/0239858 A1 * | 10/2007 | Banerji et al. ................. 709/220 |

OTHER PUBLICATIONS

U.S. Appl. No. 11/778,599, filed Jul. 16, 2007.
Non-Final Office Action from U.S. Appl. No. 11/778,599, dated Mar. 30, 2011.
U.S. Appl. No. 60/828,192, filed Oct. 4, 2006.
Final Office Action from U.S. Appl. No. 11/778,599, dated Sep. 28, 2011.
Notice of Allowance from U.S. Appl. No. 11/778,599, dated Sep. 28, 2012.

* cited by examiner

*Primary Examiner* — S. Sough
*Assistant Examiner* — Kimberly Jordan
(74) *Attorney, Agent, or Firm* — Zilka-Kotab, PC

(57) ABSTRACT

There are provided mechanisms and methods for providing a client access to an external service via an application services platform. These mechanisms and methods for providing a client access to an external service via an application services platform can provide effective access to such external service without necessarily forcing the client to access the external service separately with respect to the application services platform. The ability to provide such technique can enable the integration of an external service with an application services platform, thus allowing the client to access the external service in a more effective manner.

18 Claims, 10 Drawing Sheets

← 700

```
Web Addresses
http://www.cheenath.com
                                    | Edit | Delete |
            Name    Manoj's WebSite
     Web Address   http://www.cheenath.com
  IP Address Range
      Description Created By   Test User, 8/2/2006 1:00 PM          Modified By   Test User, 8/2/2006 1:36 PM
```

FIGURE 7

METHOD AND SYSTEM FOR PROVIDING A CLIENT ACCESS TO AN EXTERNAL SERVICE VIA AN APPLICATION SERVICES PLATFORM

CLAIM OF PRIORITY

This application claims the benefit of U.S. Provisional Patent Application 60/827,876 entitled "Method And System For Invoking An External Service From An Application Services Platform," by Manoj Cheenath et al., filed Oct. 2, 2006, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates generally to providing access to external services in a database network system.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

In conventional database systems, users access their data resources in one logical database. A user of such a conventional system typically retrieves data from and stores data on the system using the user's own systems. A user system might remotely access one of a plurality of server systems that might in turn access the database system. Data retrieval from the system might include the issuance of a query from the user system to the database system. The database system might process the request for information received in the query and send to the user system information relevant to the request.

In certain circumstances, a user may desire access to data that is not necessarily available via the database system, but rather via an external service. To date, there is no effective way of allowing access to such external service data via the database system. For example, in the case where a network browser is used to access the database system, such network browser typically does not allow access to the external service via such database system. To this end, the user is forced to access the external service separately [e.g. using a separate window or interface, and a corresponding uniform resource locator (URL), etc.]. Unfortunately, this can potentially be more time consuming, etc. There is thus a need for addressing these and/or other issues.

BRIEF SUMMARY

In accordance with embodiments, there are provided mechanisms and methods for providing a client access to an external service via an application services platform. These mechanisms and methods for providing a client access to an external service via an application services platform can enable embodiments to provide effective access to such external service without necessarily forcing the client to access the external service separately with respect to the application services platform. The ability of embodiments to provide such technique can enable the integration of an external service with an application services platform, thus allowing the client to access the external service in a more effective manner.

In an embodiment and by way of example, a method for providing a client access to an external service via an application services platform is provided. The method embodiment includes detecting a client request from an application supported by an application services platform to access an external service. An invocation message is prepared to invoke the external service on behalf of a client. Such invocation message may include various information. In use, the invocation message is sent to a proxy to cause the message information to be delivered to the external service.

While the present invention is described with reference to an embodiment in which techniques for providing a client access to an external service are implemented in a system having an application server providing a front end for an on-demand database service capable of supporting multiple tenants, the present invention is not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings, like reference numbers are used to refer to like elements. Although the following figures depict various examples of the invention, the invention is not limited to the examples depicted in the figures.

FIG. 7 illustrates a graphical user interface that may be displayed in response to the selection of one of the external services of FIG. 5, for inputting various information associated with a newly-defined external service.

DETAILED DESCRIPTION

General Overview

Systems and methods are provided for providing access to an external service via an application services platform.

Oftentimes, a user may desire access to data that is not necessarily available via an application services platform, but rather via an external service. In the context of the present description, the abovementioned application services platform may include any platform that is capable of providing application-type services. Further, the external service may include any service that is, at least in part, external to the application services platform. For example, in one embodiment, the external service may not necessarily be provided by the application services platform.

To date, there is no effective way of allowing access to such external service via the application services platform. To this end, the user is forced to access the external service data separately, which can potentially be more time consuming, etc. The following exemplary embodiments illustrate methods and mechanisms that can enable the integration of an external service with an application services platform to overcome the aforementioned drawbacks. Thus, a user may be allowed to access the external service in a more effective manner, etc.

Figure 1:
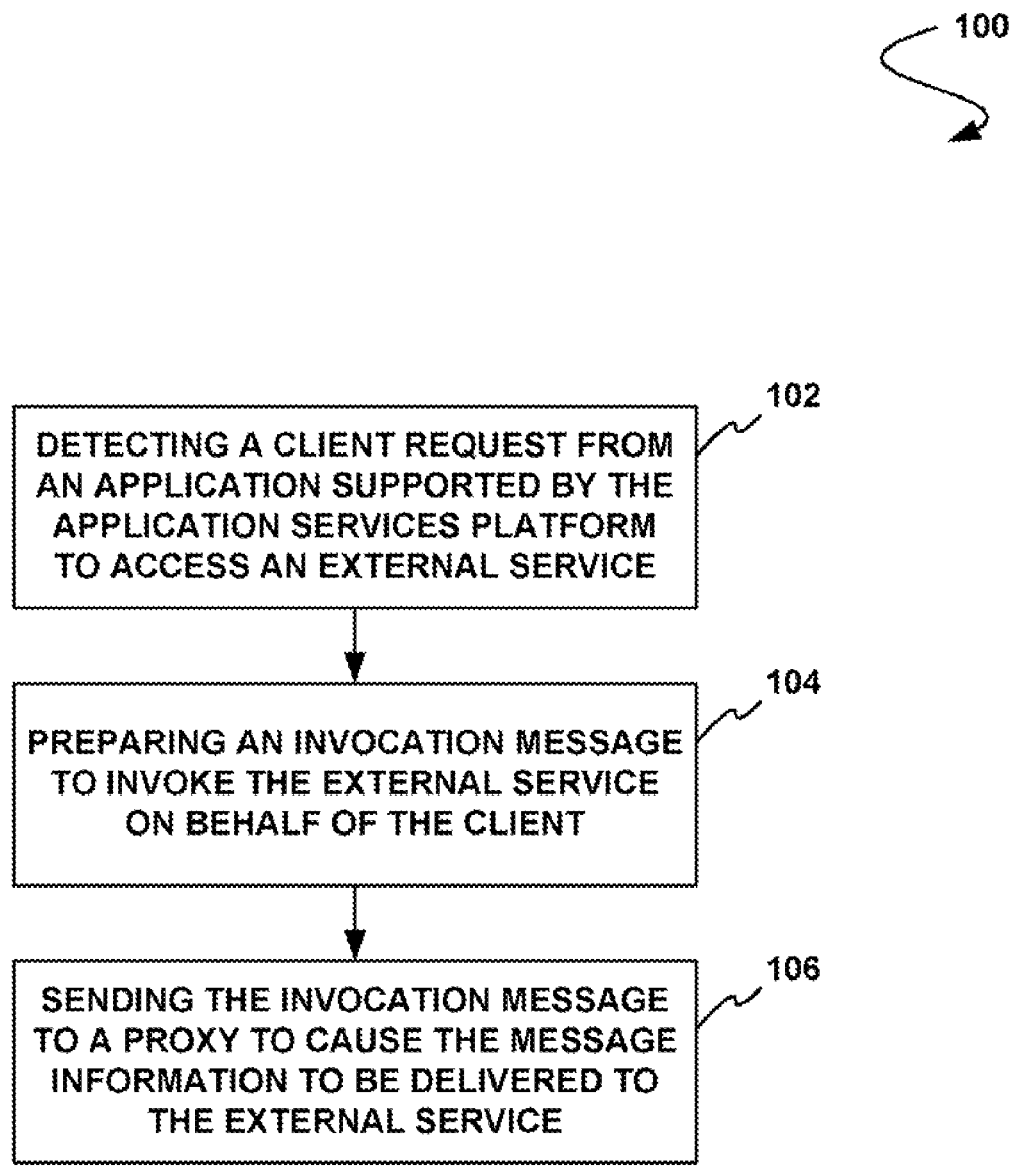
FIG. 1 illustrates a method for providing a client access to an external service via an application services platform, in accordance with one embodiment.

FIG. 1 illustrates a method 100 for providing a client access to an external service via an application services platform, in accordance with one embodiment. In one embodiment, the aforementioned application services platform may include a multi-tenant database system. As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers.

As shown, the method 100 detects a client request from an application supported by the application services platform to access an external service. See operation 102. In the context of the present description, the foregoing application may refer to any computer code that allows a client to communicate the client request to the application services platform. For example, in one embodiment, the application may include a network browser. It should be noted that other embodiments are contemplated that do not involve the use of a client. More information regarding an example of such an embodiment will be set forth in greater detail during reference to FIG. 8.

Next, in operation 104, an invocation message is prepared to invoke the external service on behalf of the client. In the context of the present description, the aforementioned invocation message may include any message that is capable of directly or indirectly invoking the external service. In various embodiments, such invocation message may include various information. For example, such information may describe the external service and/or the client, may be used by the external service for providing any desired service, and/or may include any other information to be delivered to the external service, for that matter.

To this end, such invocation message may be sent to a proxy to cause the message information to be delivered to the external service. See operation 106. In the present description, the proxy may include any hardware and/or software component (that is or is not a part of the application services platform) which is capable of causing the message information to be delivered to the external service. By this design, access is provided to the external service, without necessarily forcing a user to access the external service data separately with respect to the application services platform. A technique is thus provided which can enable the user to access the external service in a more time effective manner.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
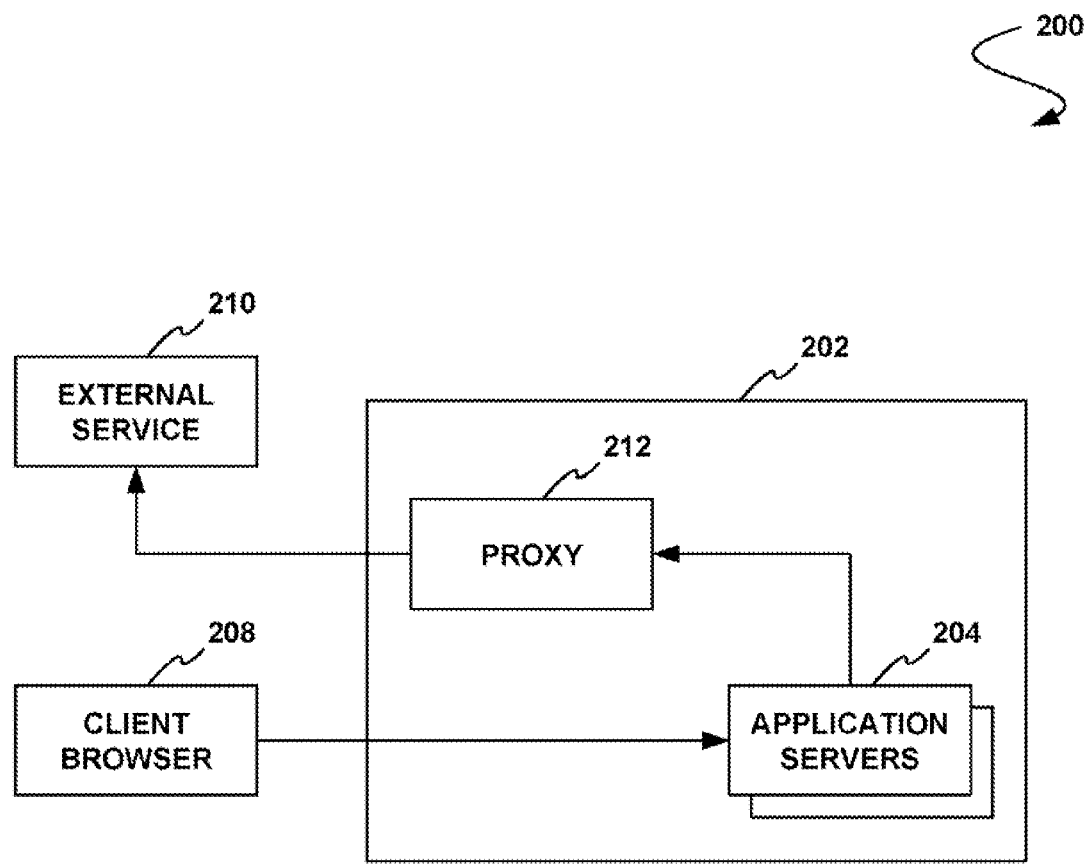
FIG. 2 shows a system for providing a client access to an external service via an application services platform, in accordance with one embodiment.

FIG. 2 shows a system 200 for providing a client access to an external service via an application services platform, in accordance with one embodiment. As an option, the present system 200 may be implemented to carry out the method 100 of FIG. 1, for example. Of course, however, the system 200 may be implemented in any desired environment. It should also be noted that the aforementioned definitions may apply during the present description.

As shown, an application services platform 202 is provided including one or more application servers 204 that are adapted for providing a plurality of services to a variety of users. One example of such application services platform 202 and application servers 204 will be described later in greater detail during reference to later illustrated embodiments. To access such services provided by the application servers 204, a client browser 208 is included. In one embodiment, such client browser 208 may include a network browser (e.g. MICROSOFT INTERNET EXPLORER, etc.) or the like that is capable of sending client requests to the application servers 204.

Also included is an external service 210 that is separate from the application services platform 202 and is adapted to provide a service that is not necessarily available via the application servers 204. In one embodiment, the external service 210 may be generated by third party developers for the purpose of being used in conjunction with the application services platform 202. Examples of such external service 210 may include, but are not limited to a data validation service for validating data stored by the application services platform 202, a data storage service for providing separate storage area beyond and separate from the application services platform 202, a legacy service that is not necessarily supported by a current version of the application services platform 202, a conventional web-service, etc.

In order to provide the client browser 208 access to the external service 210 via the application services platform 202, a proxy 212 is coupled between the application servers 204 and the external service 210, as shown. In various embodiments, the proxy 212 serves as an interface between the client browser 208 and the external service 210. To provide such interface, the complexity of the proxy 212 may range from a proxy server, to a simple interface hardware and/or software component [e.g. interface card, an application program interface (API)], etc.

While only one external service 210 and proxy 212 are shown in FIG. 2, it should be noted that one or more proxies 212 may be included for providing access to any number of different external services 210. Further, while the proxy 212 is shown to be a component of the application services platform 202, other embodiments are contemplated where such proxy 212 constitutes a separate component.

Figure 3:
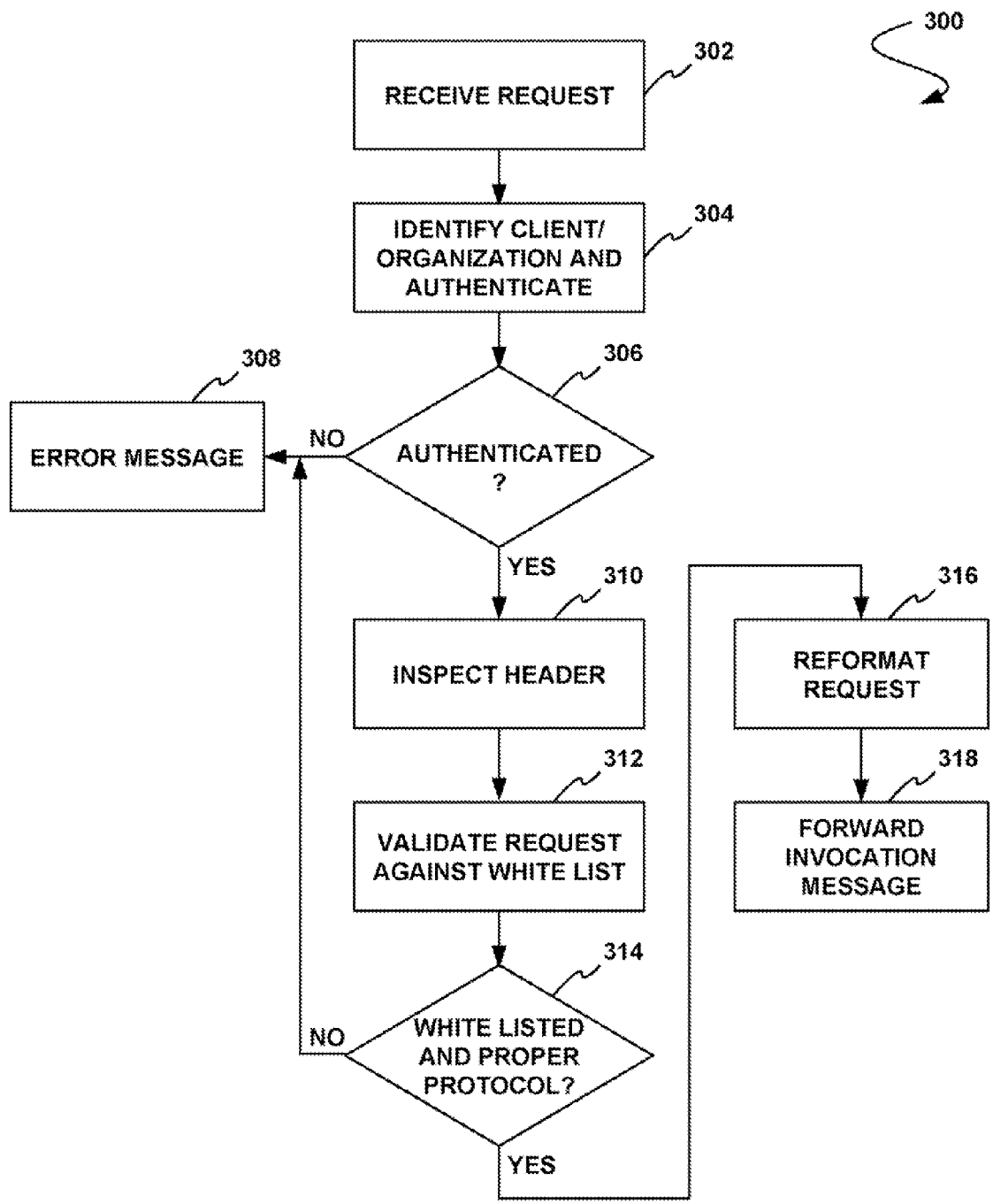
FIG. 3 shows a method for generating an invocation message that causes information to be delivered to an external service for providing a client access to the external service, in accordance with another embodiment.

FIG. 3 shows a method 300 for generating an invocation message that causes information to be delivered to an external service for providing a client access to the external service, in accordance with another embodiment. As an option, the present method 300 may be implemented in the context of the architecture and/or functionality of FIGS. 1-2. For example, the present method 300 may represent functionality of one or more application servers (e.g. the application servers 204 of the application services platform 202, etc.). Of course, however, the method 300 may be used in any desired environment. Again, the aforementioned definitions may apply during the present description.

In operation 302, a client request for an external service (e.g. the external service 210 of FIG. 2, etc.) is received at an application services platform (e.g. the application services platform 202, etc.). In various embodiments, the request may include a variety of information.

For example, the request may include information that identifies the external service. In one embodiment, such information may include a uniform resource locator (URL) or any other identifier, for that matter. Still yet, the information may describe various aspects (e.g. the type, length, etc.) of the data, if any, which is to be operated upon and/or used by the external service. Even still, the request may include various formatting information and/or any other information that may be used by the application services platform in processing and/or forwarding the contents of the request. For reasons that will soon become apparent, the request may further include authentication information (e.g. user identifier, password, cookie, HTTP information, etc.) of the user (e.g. client, associated organization, etc.).

Table 1 illustrates a couple of examples of a client request that may be received. As shown, examples of POST and GET client requests are set forth. Of course, such exemplary client requests are set forth for illustrative purposes only and should not be construed as limiting in any manner whatsoever.

TABLE 1

POST /services/proxy HTTP/1.1
User-Agent: HTTPTool/1.0
SalesforceProxy-Version: 1.0
SalesforceProxy-Endpoint: http://www.lookup.com/search
Content-Type: application/x-www-form-urlencoded
Content-Length: 32
home=Cosby&favorite+flavor=flies
----
GET /services/proxy HTTP/1.1
User-Agent: HTTPTool/1.0
SalesforceProxy-Endpoint: http://www.address.com/

Next, in operation 304, the client request may be authenticated for the purpose of identifying the user, and further determining whether the user is authentic (i.e. it is actually that which sent the request, etc.). This may be accomplished, for example, using the aforementioned authentication information, etc. To this end, the client request may be authenticated per decision 306.

If the authentication fails (e.g. due to use of improper password, etc.), an error message may be sent. On the other hand, if it is determined in decision 306 that the client request is properly authenticated, the method 300 continues with the preparation of an invocation message. By this design, the invocation message is conditionally prepared, etc., based on proper authentication.

With continuing reference to FIG. 3, the method 300 proceeds by inspecting a header of the request. See operation 310. In one embodiment, such header may include the aforementioned information describing the user and/or the desired external service.

Armed with such information, the request may be validated against a white list. In one possible embodiment, the white list may indicate, for each of a plurality of users or groups of users (e.g. associated with an organization), which external service(s) is available. As an option, the white list may further include information associated with one or more rules that may be applied as a function of users and/or external services, for enforcing the rules. In various embodiments, the rules may be different for each of a plurality of users of the application services platform.

Table 2 illustrates an exemplary white list which may be used to validate the client request per operation 312. Of course, such white list is set forth for illustrative purposes only and should not be construed as limiting in any manner whatsoever. For instance, instead of user-specific rows, a plurality white-listed external services and rules may be applied to a group of users (e.g. associated with an organization, etc.).

TABLE 2

| User_1 | External Services_1_2_3_4 | Rules_A_B_C |
| User_2 | External Services_3_4_5_6 | Rules_D_E_F |
| User_3 | External Services_1_4_5_8 | Rules_B_D_F |
| User_4 | External Services_1_2_7_8 | Rules_A_B_C |
| User_5 | External Services_5_6_7_8 | Rules_C_D_E |

In use, the aforementioned validation of operation 312 may involve a determination as to whether a user associated with the client request is allowed access to the requested external service by reviewing the white list. Still yet, it may optionally also involve determining whether the client request complies with a plurality of rules included in the white list. Such rules may relate to any aspect of the user, client request, application services platform, external service, etc.

Still yet, the rules may be predetermined and/or user-configurable, in various embodiments. For example, in a user-configurable embodiment, a user (who may be an administrator managing a group of users in an organization) may define which, if any, external service is available to each user. As an option, this may be accomplished utilizing a graphical user interface. More information regarding an exemplary graphical user interface for such purpose will be set forth hereinafter in greater detail during the description of a different embodiment.

In one embodiment, the rules may relate to a protocol associated with the client request. Such protocol may be specific to the application services platform and/or the external service. In one embodiment, the rules may require that the client request be received utilizing the HTTPS (i.e. HTTP over SSL) protocol. In other embodiments, the rules may prevent any degradation of protocols. In other embodiments, the application services platform may track, for each external service, various formatting, etc. that is necessary for a client request to be fulfilled by the particular external service. By this feature, such protocol requirements may be enforced by the application services platform, before contents of the client request are forwarded to the external service, etc.

In another embodiment, the rules may relate to an address range associated with the client request. For instance, the application services platform may require that an Internet Protocol (IP) address of a user fall within a predetermined range, for security reasons. As another example, the address range may apply to a group of users (e.g. associated with an organization such as a corporation, etc.).

Still yet, the rules may relate to a size of the client request. For example, the application services platform and/or the external service may mandate a maximum size which can not be exceeded. Such feature may be used to avoid inundating the application services platform and/or the external service, as well as prevent certain types of attacks.

For similar reasons, the rules may relate to a number of the client requests. Again, a maximum number may be established which can not be exceeded (e.g. over a predetermined time period, during a session, etc.). Even still, the rules may relate to an amount of usage of the external service associated with the client request. For example, if one or more client requests initiate processing that would require more than a predetermined amount of processing, storage, and/or bandwidth resources, various actions may be taken. In different embodiments, statistics associated with such usage, etc. may be tracked (e.g. using audit trails, etc.) on a user or group basis for the purpose of gauging the foregoing factors.

It may thus be determined whether the requested external service is white listed for the particular user and whether various aspects of the request etc. adhere to certain rules. See decision 314. If such validation fails, the client request may be blocked and an error message may be sent, as indicated in operation 308. On the other hand, if it is determined in decision 314 that the client request is properly validated, the method 300 continues with the preparation of an invocation message. By this design, the invocation message is conditionally prepared, etc., based on proper validation.

Next, the client request is reformatted to prepare the invocation message. See operation 316. Specifically, various protocol-related aspects, content, etc. of the client request may be specifically tailored for receipt and processing by the external service. For example, specific formatting may be stripped or the client request may be reformatted in a manner that makes it suitable for receipt and processing by the external service.

Table 3 illustrates a couple of examples of a reformatted invocation message that may be forwarded to a proxy (e.g. the proxy 212 of FIG. 2, etc.) for ultimate transmission to the external service. Of course, such exemplary reformatted client requests are set forth for illustrative purposes only and should not be construed as limiting in any manner whatsoever.

TABLE 3

POST /search HTTP/1.1
Host: www.lookup.com
User-Agent: SalesfroceProxy/1.0
Content-Type: application/x-www-form-urlencoded
Content-Length: 32
home=Cosby&favorite+flavor=flies
----
GET /validate/address?line1=foo&line2=bar HTTP/1.1
Host: www.address.validation
User-Agent: SalesforceProxy/1.0

Once the client request has been reformatted, the resultant invocation message is then forwarded to the proxy for transmission to the external service. See operation 318.

Figure 4:
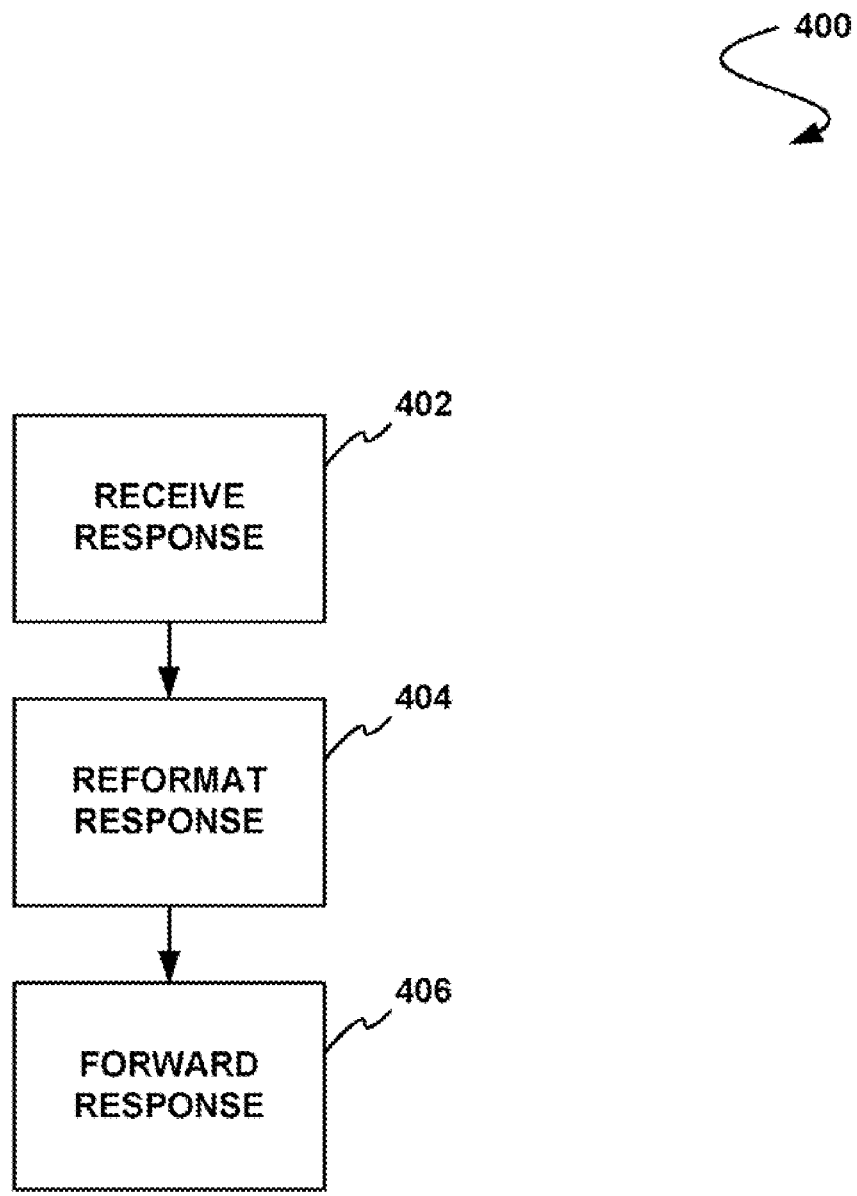
FIG. 4 shows a method for processing a response to an invocation message, in accordance with another embodiment.

FIG. 4 shows a method 400 for processing a response to an invocation message, in accordance with another embodiment. As an option, the present method 400 may be implemented in the context of the architecture and/or functionality of FIGS. 1-3. For example, the present method 400 may represent functionality of one or more application servers (e.g. the application servers 204 of the application services platform 202, etc.) upon receipt of a response to a previously sent invocation message (see FIG. 3). Of course, however, the method 400 may be used in any desired environment. Yet again, the aforementioned definitions may apply during the present description.

As shown, a response is first received in operation 402. In one embodiment, the response may be received via a proxy (e.g. the proxy 212 of FIG. 2, etc.) which communicates the same to one or more application servers (e.g. the application servers 204 of the application services platform 202, etc.). It should be noted that, in one embodiment, the response may be correlated with an associated client request, for the purpose of tracking a current session involving a client and a particular external service.

Table 4 illustrates a couple of examples of a response to an invocation message. Of course, such exemplary responses are set forth for illustrative purposes only and should not be construed as limiting in any manner whatsoever.

TABLE 4

HTTP/1.1 200 OK
Date: Mon, 23 May 2005 22:38:34 GMT
Server: Apache/1.3.27 (Unix) (Red-Hat/Linux)
Last-Modified: Wed, 08 Jan 2003 23:11:55 GMT
Etag: "3f80f-1b6-3e1cb03b"
Accept-Ranges: bytes
Content-Length: 438
Connection: close
Content-Type: text/html; charset=UTF-8
some text
----
HTTP/1.1 200 OK
Date: Mon, 23 May 2005 22:38:34 GMT
Server: Apache/1.3.27 (Unix) (Red-Hat/Linux)
Last-Modified: Wed, 08 Jan 2003 23:11:55 GMT
Etag: "3f80f-1b6-3e1cb03b"
Accept-Ranges: bytes
Content-Length: 438
Connection: close
Content-Type: text/html; charset=UTF-8
some text As shown, the responses may include a variety of information including, but not limited to a date of receipt by the proxy, description of the proxy, description of the content provided by the external service, etc.

While not shown, the method 400 of FIG. 4 may be subject to various rules, similar to those that dictated whether the method 300 of FIG. 3 can proceed. Just by way of example, the response may be conditionally processed and/or forwarded based on a size of its contents, compliance with a protocol, etc. As an additional option, the response may be processed before being forwarded to the client. Such processing may or may not involve the integration of any data included with the response with data stored at the application services platform, etc.

Next, in operation 404, the response may be reformatted to accommodate the fact that the client is to receive the external service request by way of a current connection between the client and the application services platform. Specifically, various information associated with the proxy, etc. may be stripped.

Table 5 illustrates a couple of examples of a reformatted response to an invocation message. Again, such exemplary responses are set forth for illustrative purposes only and should not be construed as limiting in any manner whatsoever.

TABLE 5

HTTP/1.1 200 OK
Date: Mon, 23 May 2005 22:38:34 GMT
Server: <salesforce-default>
Last-Modified: Wed, 08 Jan 2003 23:11:55 GMT
Etag: "3f80f-1b6-3e1cb03b"
Accept-Ranges: bytes
Content-Length: 438
Content-Type: text/html; charset=UTF-8
some text
----
HTTP/1.1 200 OK
Date: Mon, 23 May 2005 22:38:34 GMT
Server: <salesforce-default>
Last-Modified: Wed, 08 Jan 2003 23:11:55 GMT
Etag: "3f80f-1b6-3e1cb03b"
Accept-Ranges: bytes
Content-Length: 438
Content-Type: text/html; charset=UTF-8
some text The reformatted response may then be forwarded to client. See operation 406.

Figure 5:
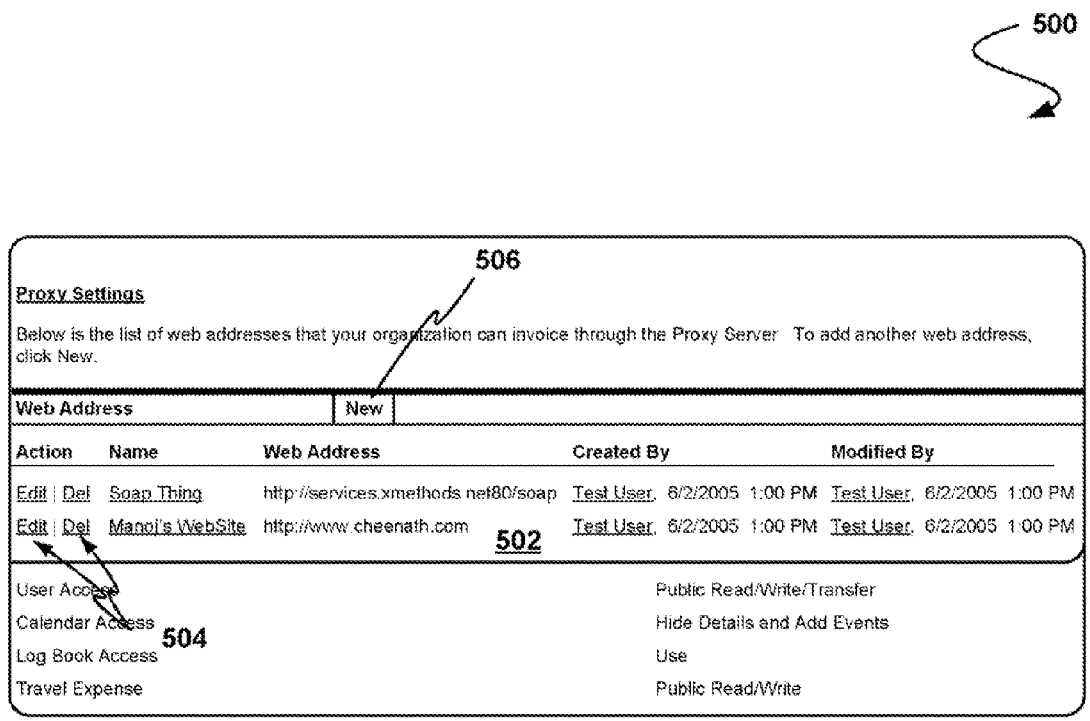
FIG. 5 shows a graphical user interface for editing a white list that controls access to various external services, in accordance with another embodiment.

FIG. 5 shows a graphical user interface 500 for editing a white list that controls access to various external services, in accordance with another embodiment. In one embodiment, the graphical user interface 500 may be provided by an application services platform (e.g. the application services platform 202 of FIG. 2, etc.) for controlling which client requests are forwarded to an associated proxy (e.g. the proxy 212, etc.). Further, such graphical user interface 500 may be accessible by an administrator for defining which external services are accessible to one or more users. In other words, the content of the graphical user interface 500 may be different for each of a plurality of users of the application services platform.

As shown, the graphical user interface 500 includes a plurality of rows 502 that each correlate with a particular external service to which the associated user may gain access. Each of such rows 502 may be edited and/or deleted utilizing a plurality of control icons 504. As shown, each of the rows 502 includes various information such as a name of the external service, a URL associated with the external service, and dates when such row was created and modified.

Figure 6:
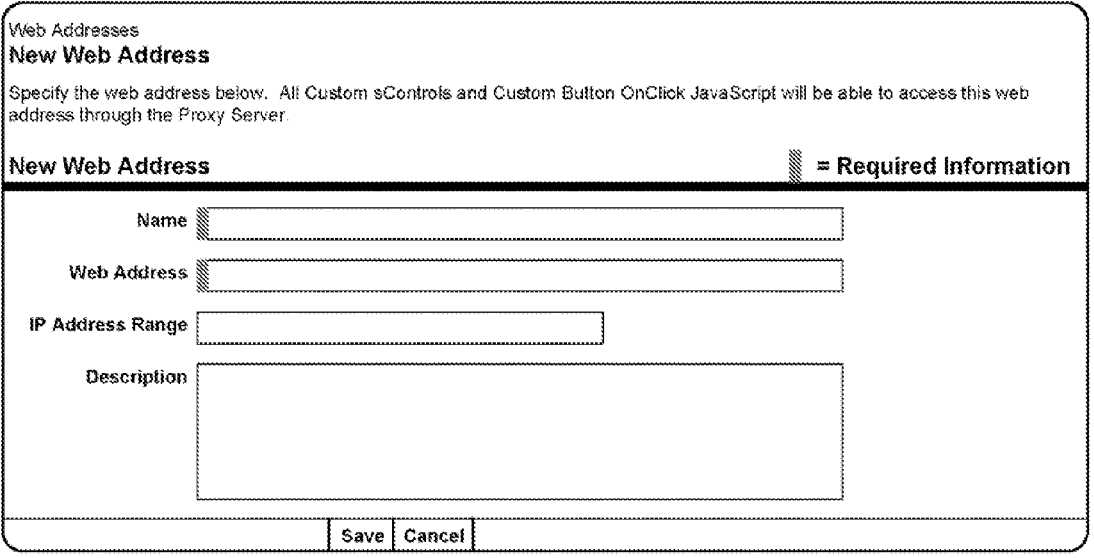
FIG. 6 illustrates a graphical user interface that may be displayed in response to the selection of the new icon of FIG. 5, for inputting various information associated with a newly-defined external service.

To create a new row and associated external service, a new icon 506 may be selected. FIG. 6 illustrates a graphical user interface 600 that may be displayed in response to the selection of the new icon 506, for inputting the various information associated with a newly-defined external service. As an option, interaction with the graphical user interface 600 may be tracked using an audit trail or the like for accountability purposes. Further, FIG. 7 illustrates a graphical user interface 700 that may be displayed in response to the selection of one of the external services of FIG. 5, for inputting the various information associated with a newly-defined external service.

Figure 8:
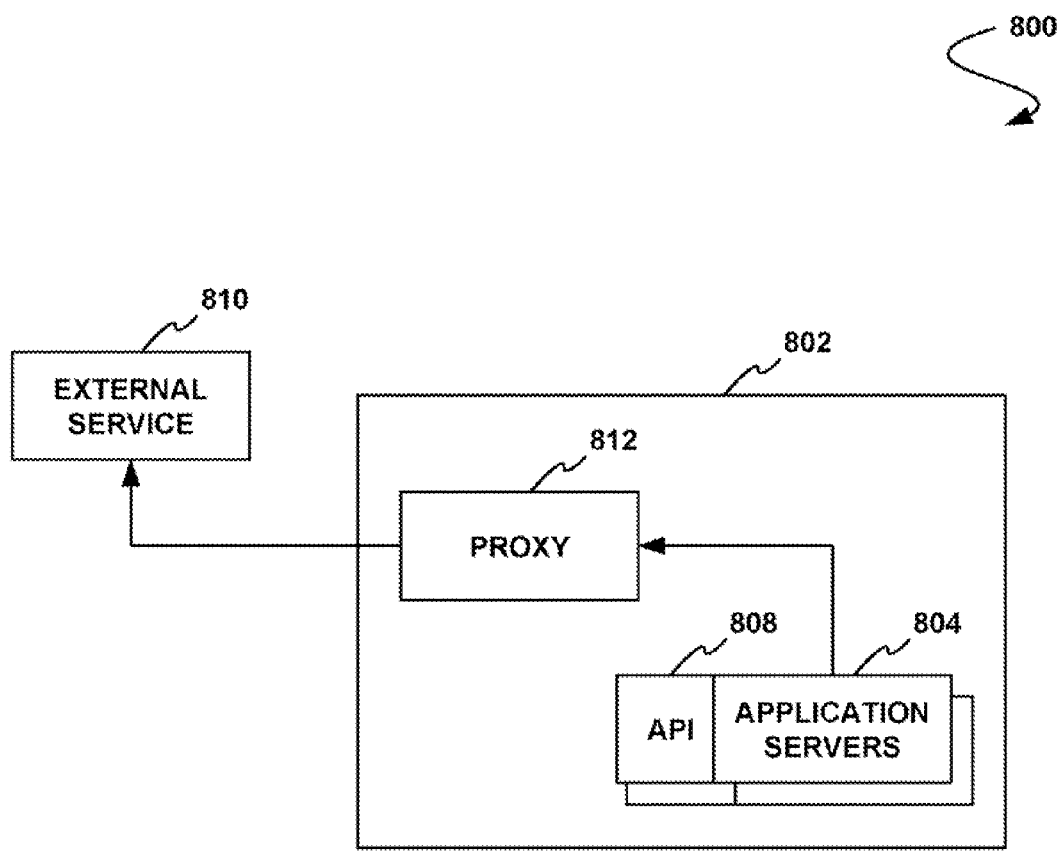
FIG. 8 shows a system for providing access to an external service via an application services platform using an application program interface (API), in accordance with one embodiment.

FIG. 8 shows a system 800 for providing access to an external service via an application services platform using an API, in accordance with one embodiment. As an option, the present system 800 may be implemented to carry out the method 100 of FIG. 1, for example. Of course, however, the system 800 may be implemented in any desired environment, and thus may or may not incorporate any of the features set forth in the previous embodiments. It should also be noted that the aforementioned definitions may apply during the present description.

As shown, an application services platform 802 is provided including one or more application servers 804 that are adapted for providing a plurality of services to a variety of users. One example of such application services platform 802 and application servers 804 will be described later in greater detail during reference to later illustrated embodiments. Unlike the system 200 of FIG. 2, the present system 800 does not necessarily rely on a client browser to initiate the services provided by the application servers 804. As shown, the application servers 804 may be accessible via an API 808.

For example, in one embodiment, the API 808 may be used to detect automatically triggered requests. Such requests may thus be generated based on any desired predetermined or user-configurable rule, etc. In one embodiment, the API 808 may include an on-demand programming language that allows third parties to write applications capable of running with the application services platform 802. For example, the API 808 may include the APEX™ API provided by salesforce.com, inc.

Also included is an external service 810 that is separate from the application services platform 802 and is adapted to provide a service that is not necessarily available via the application servers 804. In order to provide access to the external service 810 via the application services platform 802, a proxy 812 is coupled to the application servers 804. In use, the proxy 812 serves to invoke the external service 810, in response to the requests received by the application servers 804 via the API 808.

System Overview

Figure 9:
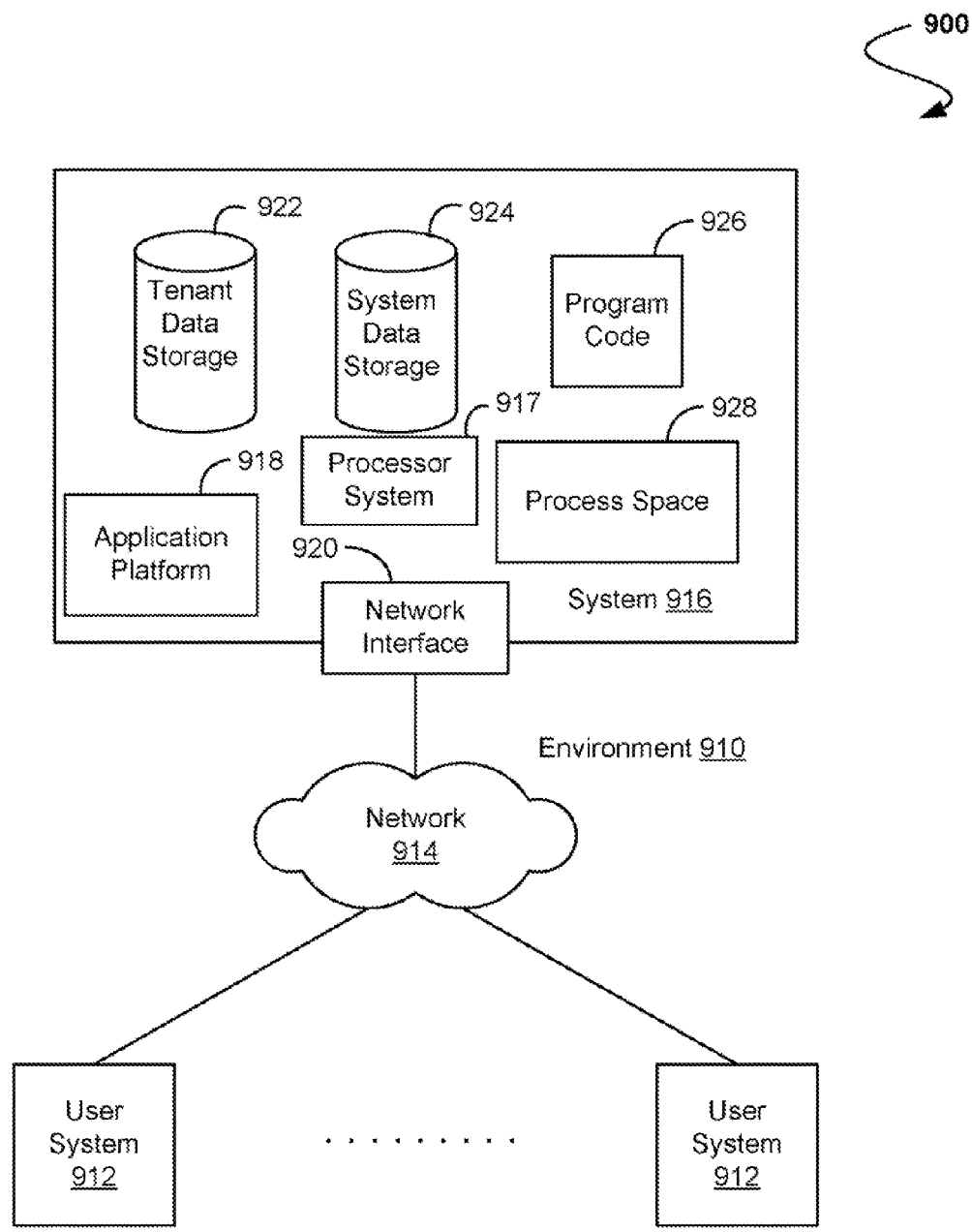
FIG. 9 illustrates a block diagram of an example of an environment wherein an on-demand database service might be used.

FIG. 9 illustrates a block diagram of an environment 910 wherein an on-demand database service might be used. As an option, any of the previously described embodiments of the foregoing figures may or may not be implemented in the context of the environment 910.

As shown, the environment 910 may include user systems 912, network 914, system 916, processor system 917, application platform 918, network interface 920, tenant data storage 922, system data storage 924, program code 926, and process space 928. In other embodiments, environment 910 may not have all of the components listed and/or may have other elements instead of or in addition to, those listed above.

Environment 910 is an environment in which an on-demand database service exists. User system 912 may be any machine or system that is used by a user to access a database user system. For example, any of user systems 912 can be a handheld computing device, a mobile phone, a laptop computer, a work station, and/or a network of computing devices. As illustrated in FIG. 9 (and in more detail in FIG. 10) user systems 912 might interact via a network 914 with an on-demand database service, which is system 916.

An on-demand database service, such as system 916, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 916" and "system 916" will be used interchangeably herein. A database image may include one or more database objects. A relational database management system (RDMS)

or the equivalent may execute storage and retrieval of information against the database object(s). Application platform 918 may be a framework that allows the applications of system 916 to run, such as the hardware and/or software, e.g., the operating system. In an embodiment, on-demand database service 916 may include an application platform 918 that enables creation, managing and executing one or more applications developed by the provider of the on-demand database service, users accessing the on-demand database service via user systems 912, or third party application developers accessing the on-demand database service via user systems 912.

The users of user systems 912 may differ in their respective capacities, and the capacity of a particular user system 912 might be entirely determined by permissions (permission levels) for the current user. For example, where a salesperson is using a particular user system 912 to interact with system 916, that user system has the capacities allotted to that salesperson. However, while an administrator is using that user system to interact with system 916, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 914 is any network or combination of networks of devices that communicate with one another. For example, network 914 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the present invention might use are not so limited, although TCP/IP is a frequently implemented protocol.

User systems 912 might communicate with system 916 using TCP/IP and, at a higher network level, use other common Internet protocols to communicate, such as HTTP, FTP, AFS, WAP, etc. In an example where HTTP is used, user system 912 might include an HTTP client commonly referred to as a "browser" for sending and receiving HTTP messages to and from an HTTP server at system 916. Such an HTTP server might be implemented as the sole network interface between system 916 and network 914, but other techniques might be used as well or instead. In some implementations, the interface between system 916 and network 914 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 916, shown in FIG. 9, implements a web-based customer relationship management (CRM) system. For example, in one embodiment, system 916 includes application servers configured to implement and execute CRM software applications as well as provide related data, code, forms, webpages and other information to and from user systems 912 and to store to, and retrieve from, a database system related data, objects, and Web page content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 916 implements applications other than, or in addition to, a CRM application. For example, system 916 may provide tenant access to multiple hosted (standard and custom) applications, including a CRM application. User (or third party developer) applications, which may or may not include CRM, may be supported by the application platform 918, which manages creation, storage of the applications into one or more database objects and executing of the applications in a virtual machine in the process space of the system 916.

Figure 10:
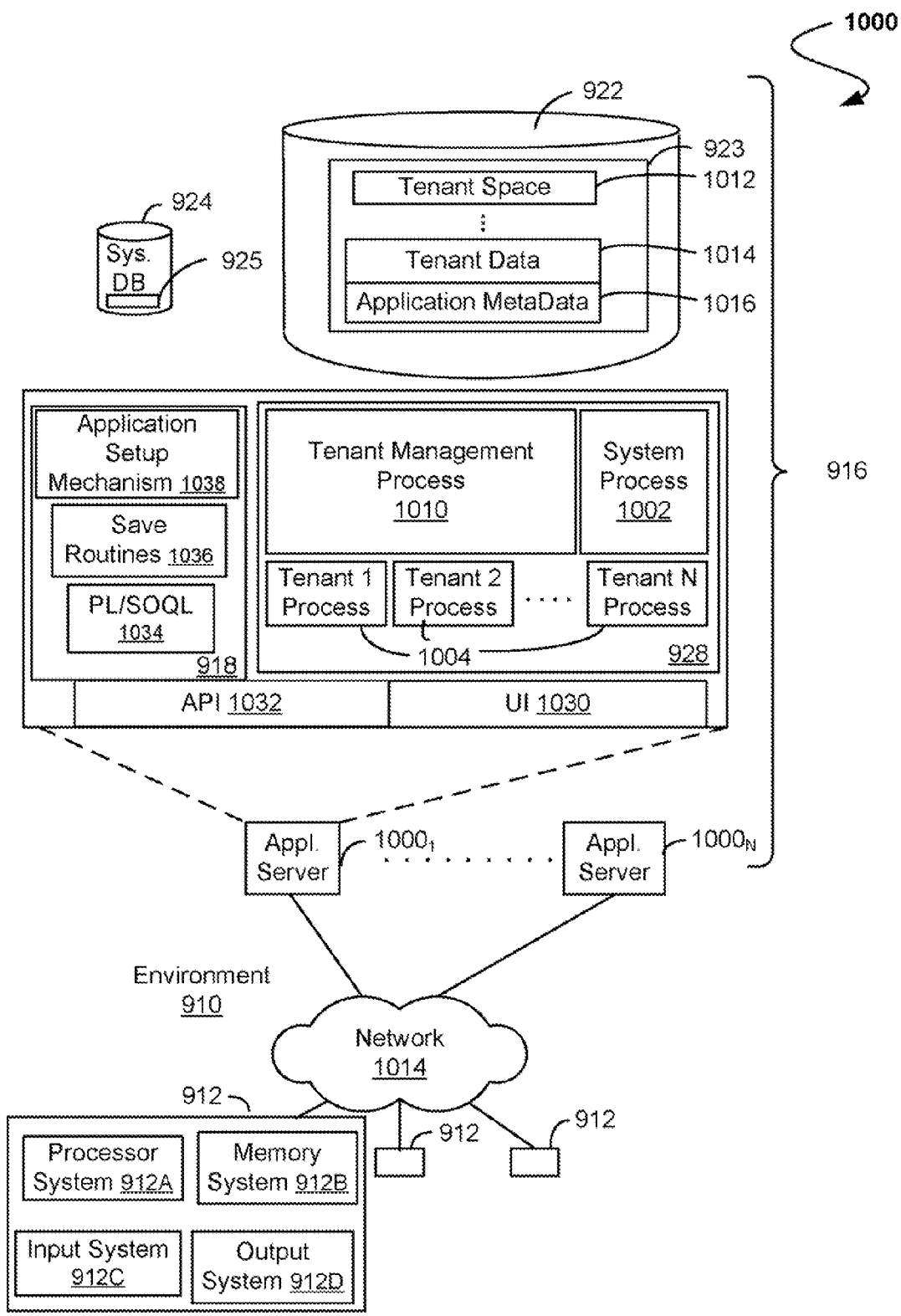
FIG. 10 illustrates a block diagram of an embodiment of elements of FIG. 9 and various possible interconnections between these elements.

One arrangement for elements of system 916 is shown in FIG. 10, including a network interface 920, application platform 918, tenant data storage 922 for tenant data 923, system data storage 924 for system data 925 accessible to system 916 and possibly multiple tenants, program code 926 for implementing various functions of system 916, and a process space 928 for executing MTS system processes and tenant-specific processes, such as running applications as part of an application hosting service. Additional processes that may execute on system 916 include database indexing processes.

Several elements in the system shown in FIG. 9 include conventional, well-known elements that are explained only briefly here. For example, each user system 912 could include a desktop personal computer, workstation, laptop, PDA, cell phone, or any wireless access protocol (WAP) enabled device or any other computing device capable of interfacing directly or indirectly to the Internet or other network connection. User system 912 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 912 to access, process and view information, pages and applications available to it from system 916 over network 914. Each user system 912 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 916 or other systems or servers. For example, the user interface device can be used to access data and applications hosted by system 916, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 912 and all of its components are operator configurable using applications, such as a browser, including computer code run using a central processing unit such as an Intel Pentium® processor or the like. Similarly, system 916 (and additional instances of an MTS, where more than one is present) and all of their components might be operator configurable using application(s) including computer code to run using a central processing unit such as processor system 917, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 916 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments of the present invention can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 916 is configured to provide webpages, forms, applications, data and media content to user (client) systems 912 to support the access by user systems 912 as tenants of system 916. As such, system 916 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

FIG. 10 also illustrates environment 910. However, in FIG. 10 elements of system 916 and various interconnections in an embodiment are further illustrated. FIG. 10 shows that user system 912 may include processor system 912A, memory system 912B, input system 912C, and output system 912D. FIG. 10 shows network 914 and system 916. FIG. 10 also shows that system 916 may include tenant data storage 922, tenant data 923, system data storage 924, system data 925, User interface (UI) 1030, API 1032, PL/SOQL 1034, save routines 1036, application setup mechanism 1038, applications servers $1000_1$-$1000_N$, system process space 1002, tenant process spaces 1004, tenant management process space 1010, tenant storage area 1012, user storage 1014, and application metadata 1016. In other embodiments, environment 910 may not have the same elements as those listed above and/or may have other elements instead of, or in addition to, those listed above.

User system 912, network 914, system 916, tenant data storage 922, and system data storage 924 were discussed above in FIG. 9. Regarding user system 912, processor system 912A may be any combination of one or more processors. Memory system 912B may be any combination of one or more memory devices, short term, and/or long term memory. Input system 912C may be any combination of input devices, such as one or more keyboards, mice, trackballs, scanners, cameras, and/or interfaces to networks. Output system 912D may be any combination of output devices, such as one or more monitors, printers, and/or interfaces to networks. As shown by FIG. 10, system 916 may include a network interface 920 (of FIG. 9) implemented as a set of HTTP application servers 1000, an application platform 918, tenant data storage 922, and system data storage 924. Also shown is system process space 1002, including individual tenant process spaces 1004 and a tenant management process space 1010. Each application server 1000 may be configured to tenant data storage 922 and the tenant data 923 therein, and system data storage 924 and the system data 925 therein to serve requests of user systems 912. The tenant data 923 might be divided into individual tenant storage areas 1012, which can be either a physical arrangement and/or a logical arrangement of data. Within each tenant storage area 1012, user storage 1014 and application metadata 1016 might be similarly allocated for each user. For example, a copy of a user's most recently used (MRU) items might be stored to user storage 1014. Similarly, a copy of MRU items for an entire organization that is a tenant might be stored to tenant storage area 1012. A UI 1030 provides a user interface and an API 1032 provides an application programmer interface to system 916 resident processes to users and/or developers at user systems 912. The tenant data and the system data may be stored in various databases, such as one or more Oracle™ databases.

Application platform 918 includes an application setup mechanism 1038 that supports application developers' creation and management of applications, which may be saved as metadata into tenant data storage 922 by save routines 1036 for execution by subscribers as one or more tenant process spaces 1004 managed by tenant management process 1010 for example. Invocations to such applications may be coded using PL/SOQL 1034 that provides a programming language style interface extension to API 1032. A detailed description of some PL/SOQL language embodiments is discussed in commonly owned co-pending U.S. Provisional Patent Application 60/828,192 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 4, 2006, which is incorporated in its entirety herein for all purposes. Invocations to applications may be detected by one or more system processes, which manages retrieving application metadata 1016 for the subscriber making the invocation and executing the metadata as an application in a virtual machine.

Each application server 1000 may be communicably coupled to database systems, e.g., having access to system data 925 and tenant data 923, via a different network connection. For example, one application server $1000_1$ might be coupled via the network 914 (e.g., the Internet), another application server $1000_{N-1}$ might be coupled via a direct network link, and another application server $1000_N$ might be coupled by yet a different network connection. Transfer Control Protocol and Internet Protocol (TCP/IP) are typical protocols for communicating between application servers 1000 and the database system. However, it will be apparent to one skilled in the art that other transport protocols may be used to optimize the system depending on the network interconnect used.

In certain embodiments, each application server 1000 is configured to handle requests for any user associated with any organization that is a tenant. Because it is desirable to be able to add and remove application servers from the server pool at any time for any reason, there is preferably no server affinity for a user and/or organization to a specific application server 1000. In one embodiment, therefore, an interface system implementing a load balancing function (e.g., an F5 Big-IP load balancer) is communicably coupled between the application servers 1000 and the user systems 912 to distribute requests to the application servers 1000. In one embodiment, the load balancer uses a least connections algorithm to route user requests to the application servers 1000. Other examples of load balancing algorithms, such as round robin and observed response time, also can be used. For example, in certain embodiments, three consecutive requests from the same user could hit three different application servers 1000, and three requests from different users could hit the same application server 1000. In this manner, system 916 is multi-tenant, wherein system 916 handles storage of, and access to, different objects, data and applications across disparate users and organizations.

As an example of storage, one tenant might be a company that employs a sales force where each salesperson uses system 916 to manage their sales process. Thus, a user might maintain contact data, leads data, customer follow-up data, performance data, goals and progress data, etc., all applicable to that user's personal sales process (e.g., in tenant data storage 922). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 916 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 916 might also maintain system level data usable by multiple tenants or other data. Such system level data might include industry reports, news, postings, and the like that are shamble among tenants.

In certain embodiments, user systems 912 (which may be client systems) communicate with application servers 1000 to request and update system-level and tenant-level data from system 916 that may require sending one or more queries to tenant data storage 922 and/or system data storage 924. System 916 (e.g., an application server 1000 in system 916) automatically generates one or more SQL statements (e.g., one or more SQL queries) that are designed to access the desired information. System data storage 924 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to the present invention, it should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields, U.S. patent application Ser. No. 10/817,161, filed Apr. 2, 2004, entitled "CUSTOM ENTITIES AND FIELDS IN A MULTI-TENANT DATABASE SYSTEM", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A method, comprising:
   detecting a client request from an application supported by an application services platform including at least one application server to access an external service, the client request including authentication information for authenticating a client executing the application;
   identifying the client from the authentication;
   determining whether the client request complies with at least one rule specific to the identified client, including:

identifying statistics associated with the client request, wherein the statistics are gathered from tracking previous usage of the external service;

gauging an amount of usage of the external service required by the client request, based on the statistics gathered from tracking previous usage of the external service;

comparing the amount of usage of the external service gauged to be required by the client request to a predetermined amount of usage of the external service allowed by one of the rules specific to the client; and determining that the client request does not comply with the one of the rules specific to the client when the amount of usage of the external service gauged to be required by the client request exceeds the predetermined amount of usage of the external service allowed by one of the rules specific to the client; and determining that the client request complies with the one of the rules specific to the client when the amount of usage of the external service gauged to be required by the client request does not exceed the predetermined amount of usage of the external service allowed by one of the rules specific to the client;

authenticating the client request using the authentication information for determining whether the client sent the client request, by the application services platform;

preparing an invocation message to invoke the external service on behalf of the client only in response to a determination based on the authentication that the client sent the client request and the determination that the client request complies with the one of the rules specific to the client, the invocation message including message information; and sending the invocation message to a proxy separate from the at least one application server of the application services platform to cause the message information to be delivered to the external service.

2. The method of claim 1, wherein the application includes a network browser.

3. The method of claim 1, wherein the external service is not provided by the application services platform.

4. The method of claim 1, wherein the message information is received, at least in part, with the client request.

5. The method of claim 1, wherein another one of the rules relates to a protocol associated with the client request.

6. The method of claim 1, wherein another one of the rules relates to an address range associated with the client request.

7. The method of claim 1, wherein another one of the rules relates to a size of the client request.

8. The method of claim 1, wherein another one of the rules relates to a number of the client requests.

9. The method of claim 1, wherein the at least one rule is user configurable.

10. The method of claim 1, wherein the at least one rule is different for a plurality of other clients.

11. The method of claim 1, wherein the client request is reformatted to prepare the invocation message.

12. The method of claim 1, wherein the application services platform includes a multi-tenant database system.

13. The method of claim 1, wherein the external service includes a data validation service for validating data stored by the application services platform.

14. The method of claim 1, wherein another one of the rules defines whether the external service is allowed to be accessed by the client.

15. The method of claim 1, wherein the tracking of the previous usage of the external service is specific to previous usage of the external service by the client.

16. The method of claim 1, further comprising:

receiving from the proxy a response to the invocation message issued by the external service, the response received from the proxy including a date of receipt by the proxy, a description of the proxy, and a description of content provide by the external service;

determining whether the response complies with at least one other rule separate from the at least one rule specific to the identified client;

conditionally processing the response to forward the processed response to the client, wherein the response is processed when it is determined that the response complies with the at least one other rule and the response is not processed when it is determined that the response does not comply with the at least one other rule;

wherein the processing includes integrating data included in the response with data stored at the application services platform.

17. A non-transitory machine-readable medium carrying one or more sequences of instructions which, when executed by one or more processors, cause the one or more processors to carry out the steps of:

detecting a client request from an application supported by an application services platform including at least one application server to access an external service, the client request including authentication information for authenticating a client executing the application;

identifying the client from the authentication;

determining whether the client request complies with at least one rule specific to the identified client, including:

identifying statistics associated with the client request, wherein the statistics are gathered from tracking previous usage of the external service;

gauging an amount of usage of the external service required by the client request, based on the statistics gathered from tracking previous usage of the external service;

comparing the amount of usage of the external service gauged to be required by the client request to a predetermined amount of usage of the external service allowed by one of the rules specific to the client; and determining that the client request does not comply with the one of the rules specific to the client when the amount of usage of the external service gauged to be required by the client request exceeds the predetermined amount of usage of the external service allowed by one of the rules specific to the client; and determining that the client request complies with the one of the rules specific to the client when the amount of usage of the external service gauged to be required by the client request does not exceed the predetermined amount of usage of the external service allowed by one of the rules specific to the client;

authenticating the client request using the authentication information for determining whether the client sent the client request, by the application services platform;

preparing an invocation message to invoke the external service on behalf of the client only in response to a determination based on the authentication that the client sent the client request and the determination that the client request complies with the one of the rules specific to the client, the invocation message including message information; and sending the invocation message to a proxy separate from the at least one application server of the application services platform to cause the message information to be delivered to the external service.

18. An apparatus, comprising:

a processor; and one or more stored sequences of instructions which, when executed by the processor, cause the processor to carry out the steps of:

detecting a client request from an application supported by an application services platform including at least one application server to access an external service, the client request including authentication information for authenticating a client executing the application;

identifying the client from the authentication;

determining whether the client request complies with at least one rule specific to the identified client, including:

identifying statistics associated with the client request, wherein the statistics are gathered from tracking previous usage of the external service;

gauging an amount of usage of the external service required by the client request, based on the statistics gathered from tracking previous usage of the external service;

comparing the amount of usage of the external service gauged to be required by the client request to a predetermined amount of usage of the external service allowed by one of the rules specific to the client; and determining that the client request does not comply with the one of the rules specific to the client when the amount of usage of the external service gauged to be required by the client request exceeds the predetermined amount of usage of the external service allowed by one of the rules specific to the client; and determining that the client request complies with the one of the rules specific to the client when the amount of usage of the external service gauged to be required by the client request does not exceed the predetermined amount of usage of the external service allowed by one of the rules specific to the client;

authenticating the client request using the authentication information for determining whether the client sent the client request, by the application services platform;

preparing an invocation message to invoke the external service on behalf of the client only in response to a determination based on the authentication that the client sent the client request and the determination that the client request complies with the one of the rules specific to the client, the invocation message including message information; and sending the invocation message to a proxy separate from the at least one application server of the application services platform to cause the message information to be delivered to the external service.

* * * * *